(12) United States Patent
Zhao et al.

(10) Patent No.: US 10,951,249 B1
(45) Date of Patent: Mar. 16, 2021

(54) SYSTEM AND METHOD FOR TIME-INTERPOLATED POWER CHANGE IN A DIGITAL PRE-DISTORTION CIRCUIT

(71) Applicant: Xilinx, Inc., San Jose, CA (US)

(72) Inventors: Hongzhi Zhao, Los Gatos, CA (US); Vince C Barnes, El Paso, TX (US); Xiaohan Chen, Sunnyvale, CA (US); Hemang Parekh, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 16/830,481

(22) Filed: Mar. 26, 2020

(51) Int. Cl.
*H04B 1/04* (2006.01)
*H04W 52/16* (2009.01)

(52) U.S. Cl.
CPC .......... *H04B 1/0475* (2013.01); *H04W 52/16* (2013.01); *H04B 2001/0416* (2013.01); *H04B 2001/0425* (2013.01)

(58) Field of Classification Search
CPC .......... H04B 1/0475; H04B 2001/0416; H04B 2001/0425; H04W 52/16
USPC ......................................... 375/224, 296, 297
See application file for complete search history.

(56) References Cited

U.S. PATENT DOCUMENTS

| | | | |
|---|---|---|---|
| 9,036,734 B1 * | 5/2015 | Mauer ................ | H04B 1/0475 375/296 |
| 2016/0036471 A1 * | 2/2016 | Subrahmaniyan Radhakrishnan ..... | H03F 1/3241 375/224 |

* cited by examiner

*Primary Examiner* — Fitwi Y Hailegiorgis
(74) *Attorney, Agent, or Firm* — Haynes and Boone, LLP

(57) ABSTRACT

A transmit circuit operated with time-interpolated digital pre-distortion (DPD) coefficients to improve adjacent channel power ratio (ACPR) performance during a power mode change is provided. The transmit circuit includes a DPD circuit configured to operate with a first DPD coefficient according to a first transmit power level of a transmit power amplifier of the transmit circuit. The transmit circuit further includes a DPD coefficient management engine configured to retrieve a second DPD coefficient corresponding to the second transmit power level. The transmit circuit further includes a DPD coefficient time-interpolation engine configured to compute a set of time-interpolated DPD coefficients corresponding to a set of time instants for a transient period when the transmit power amplifier is adapted to the second DPD coefficient.

20 Claims, 7 Drawing Sheets

SYSTEM AND METHOD FOR TIME-INTERPOLATED POWER CHANGE IN A DIGITAL PRE-DISTORTION CIRCUIT

TECHNICAL FIELD

Examples of the present disclosure generally relate to integrated circuits ("ICs") and, in particular, to an embodiment related to ICs including digital pre-distortion (DPD) circuits.

BACKGROUND

A digital pre-distortion (DPD) circuit is usually operated at a radio transmitter to improve the linearity and efficiency of transmitter power amplifiers. A DPD adaptation engine usually works together with the DPD circuit to adapt the transmitter power amplifier to the DPD coefficients used to run the DPD circuit. In a 5G massive multiple-input multiple-output (MIMO) base station, a single DPD adaptation engine is used for multiple radio frequency (RF) amplifiers for multiple transmission channels. In this case, the DPD adaptation engine adapts each RF amplifier sequentially. For example, when the base station transmit power changes from a low power mode to a high power mode, the temperatures and gains of the RF amplifiers may change significantly. The transient period for each transmit power amplifier to stabilize at the high transmit power mode after transition from the low transmit power mode can be as long as several seconds. During the transient period, the DPD adaptation engine adapts the DPD coefficients for the multiple RF amplifiers until all RF amplifiers stabilize at the high transmit power mode. Thus, the Adjacent Channel Power Ratio (ACPR) performance of the DPD circuit may compromise during the transient period, and sometimes may fall out of the range of the 3rd Generation Partnership Project (3GPP) and Federal Communication Committee (FCC) standards.

Accordingly, it would be desirable and useful to improve ACPR performance of the DPD circuit at a RF transmitter during power mode transition.

SUMMARY

Other aspects and features will be evident from reading the following detailed description and accompanying drawings.

In view of need to improve ACPR performance during power mode change of a RF transmitter, embodiments described herein provide a transmit circuit operated with time-interpolated digital pre-distortion (DPD) coefficients to improve adjacent channel power ratio (ACPR) performance during a power mode change is provided. The transmit circuit includes a DPD circuit configured to operate with a first adapted DPD coefficient according to a first transmit power level of a transmit power amplifier of the transmit circuit. The transmit circuit further includes a DPD coefficient management engine configured to retrieve a second adapted DPD coefficient corresponding to the second transmit power level. The transmit circuit further includes a DPD coefficient time-interpolation engine configured to compute a set of time-interpolated DPD coefficients corresponding to a set of time instants for a transient period when the transmit power of the amplifier changes from the first level to the second level.

In one implementation, the transmit circuit further includes a power detector configured to detect the power mode change of the transmit power amplifier from the first transmit power level to a second transmit power level; and provide an indication of the power mode change to the DPD coefficient management engine.

In one implementation, the transmit circuit further includes a DPD coefficient database configured to store different DPD coefficients corresponding to different transmit power levels; and provide the second DPD coefficients to the DPD coefficient management engine in response to a query indicating the second transmit power level.

In one implementation, the transmit circuit further includes a DPD adaptation engine configured to adapt DPD coefficients used for operating the DPD circuit for the transmit power amplifier in response to a changed transmit power level.

In one implementation, the transmit circuit further includes a timer configured to maintain a counter for the transient period during which the set of time-interpolated DPD coefficients are used for operating the DPD circuit.

In one implementation, the DPD coefficient time-interpolation engine is configured to compute the set of time-interpolated DPD coefficients by computing a time-varying representation of a transmit power amplifier temperature during the transient period based on a first stable temperature of the transmit power amplifier at the first transmit power level and a second stable temperature of the transmit power amplifier at the second transmit power level.

In one implementation, the DPD coefficient time-interpolation engine is configured to compute the set of time-interpolated DPD coefficients by computing a representation of DPD coefficient that is linear over the time-varying representation of the transmit power amplifier temperature based on the first DPD coefficient and the second DPD coefficient.

In one implementation, the DPD coefficient time-interpolation engine is configured to compute the set of time-interpolated DPD coefficients by extracting the set of time-interpolated DPD coefficients from the computed representation of DPD coefficient at the set of time instants.

In one implementation, the transmit circuit further includes a plurality of parallel DPD circuits all configured to operate at the first DPD coefficient. The DPD coefficient time-interpolation engine is configured to compute and provide the set of time-interpolated DPD coefficients for operating all the plurality of parallel DPD circuits at the set of time instants during the transient period.

In one implementation, the transmit circuit further includes a plurality of parallel DPD circuits. Each DPD circuit is configured to operate at a respective DPD coefficient, and each DPD circuit is coupled to a respective DPD coefficient time-interpolation engine configured to compute and provide a respective set of time-interpolated DPD coefficients for operating the respective DPD circuit during a respective transient period when the respective transmit power level corresponding to the respective DPD circuit changes.

Embodiments described herein further provide a method including operating a digital pre-distortion (DPD) component at a transmit circuit with a first DPD coefficient according to a first transmit power level of a transmit power amplifier of the transmit circuit. The method further includes in response to a power mode change of the transmit power amplifier from the first transmit power level to a second transmit power level, retrieving a second DPD coefficient corresponding to the second transmit power level. The method further includes computing a set of time-interpolated DPD coefficients corresponding to a set of time instants for a transient period when the temperature of the transmit power amplifier is changed from a first temperature corresponding to the first transmit power level to a second temperature corresponding to the second transmit power level, and operating the DPD circuit using the set of time-interpolated DPD coefficients at the set of time instants during the transient period.

DETAILED DESCRIPTION

Figure 1:
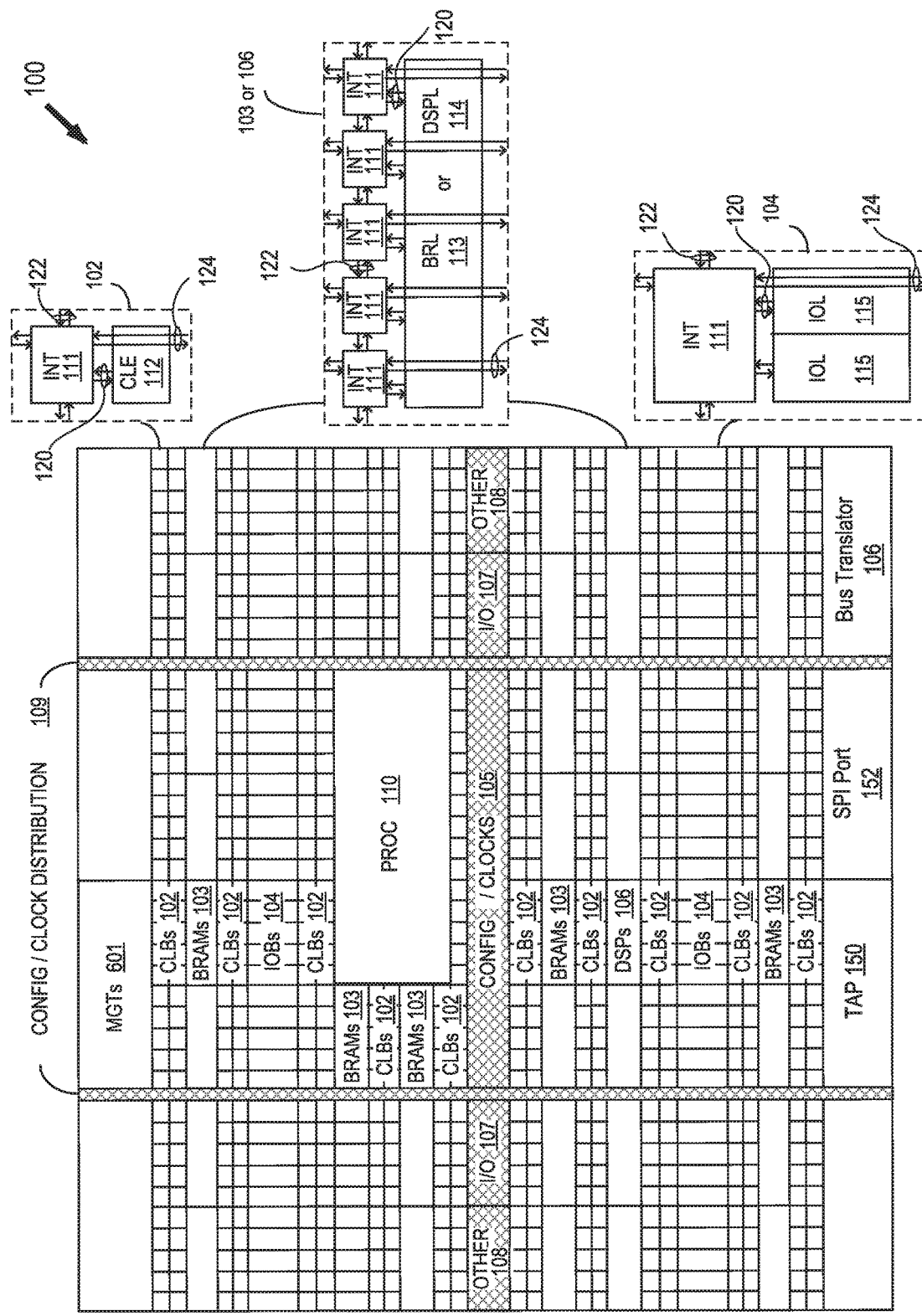
FIG. 1 is a block diagram illustrating an exemplary architecture for an IC on which a RF MIMO transmitter containing one or more DPD circuits may be implemented, according to some embodiments of the present disclosure.

Various embodiments are described hereinafter with reference to the figures, in which exemplary embodiments are shown. The claimed invention may, however, be embodied in different forms and should not be construed as being limited to the embodiments set forth herein. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described. The features, functions, and advantages may be achieved independently in various embodiments or may be combined in yet other embodiments.

Before describing exemplary embodiments illustratively depicted in the several figures, a general introduction of a DPD circuit and the ACPR performance degradation issue during power mode transition is provided to further understanding. In 4G or 5G orthogonal frequency-division multiplexing (OFDM) modulations, data is usually transmitted frame by frame with a frame length of several milliseconds, e.g., 10 ms. When a RF power amplifier is running with a light data load transmission (e.g., correspondingly a low average amplifier output power) for a long time, the power amplifier may have a low overall temperature. When the power amplifier is switched to a full load operation (e.g., correspondingly a high average amplifier output Power), the power amplifier may be heated up from a low temperature state to a high temperature state. Although the thermal constant of an amplifier transistor is usually in the order of milliseconds, as the power amplifier is usually mounted on a thermal dissipation plate, the combined thermal constant of the power amplifier and the thermal dissipation plate can be in the order of as long as a few seconds.

The gain of a power amplifier can be expressed as a function of the temperature of the amplifier. Hence, the non-linear model of the power amplifier and its digital predistortion model are also functions of the amplifier temperature. In a MIMO transmitter, a single DPD adaptation engine can be used to adapt the DPD coefficients for the multiple RF amplifiers on parallel transmission channels sequentially. By using only one DPD adaptation engine for different transmission paths in the MIMO transmitter, hardware implementation cost may be reduced. For example, in a 64-antenna MIMO system, only one DPD adaptation engine is used to adapt the DPD circuits corresponding to eight RF power amplifiers sequentially.

In 5G massive MIMO application, the discrete-time signal processing (DSP) processing time for one adaptation iteration is much longer than that in a 4G application. For example, the typical adaptation time may be about 300 ms for 200 MHz bandwidth DPD. Thus, it may take about 2-3 seconds for one DPD adaptation engine to finish one adaptation iteration for eight power amplifiers in a row. The DPD adaptation engine usually adapts the DPD coefficients in a stable transmit power state. The adapted DPD coefficients are saved according to several different transmit root mean square (RMS) power levels. A transmit power meter may be used to monitor the transmit RMS power for each PA in order to select the DPD coefficients to run the DPD circuit. When the power meter reports a significant step transmit power change, the DPD adaptation engine may use the saved DPD coefficients corresponding to the new transmitter RMS power in the corresponding DPD data paths. This process is called transmit power indexed DPD coefficients switch.

However, the DPD coefficients switch often cannot address the transient period from the one transmit power level to another transmit power level. During the transient period, the power amplifier temperature (and the amplifier gain accordingly) will drift from one stable state to another stable state, during which both the ACPR and error vector magnitude (EVM) performances may degrade significantly. Some existing systems adopt each DPD data path with a long time constant gain accumulation circuit to address the transient ACPR and EVM performance degradation. But the resulting hardware cost can be almost twice that much compared to the normal DPD data path. In addition, as the transient period from one power level to another power level is usually longer than one second, it often takes about one second for the feedback analog-to-digital converter (ADC) to take the feedback data to adapt of the long time constant DPD data path, meaning at least eight seconds for the feedback ADC to take the feedback data for eight power amplifiers. For the MIMO applications, the RMS step power change occurs at same time for all the eight power amplifiers, it can be difficult to take the feedback data during the transient period in the DPD architecture of one feedback ADC for eight power amplifiers without a significant delay.

In view of the ACPR and EVM degradation issue due to the step RMS transmit power change in a MIMO transmitter, embodiments described herein provide time-interpolated DPD coefficient adaptation for the DPD circuit during a transient period when the power mode switches at the transmit power amplifier of the transmitter along the DPD signal path. Specifically, instead of adapting DPD coefficients directly to coefficients corresponding to a stable power state even it takes time for the power level of the power amplifier to stabilize after the power mode change, a set of time-interpolated DPD coefficients that change over time during the transient period when the power mode changes from one power level to another power level are adopted. The DPD circuit is operated with DPD coefficients that are gradually adapted with the actual operating power change of the power amplifier during the transient period when the power amplifier changes from a first power mode to a second power mode. In this way, the ACPR and EVM performance of the DPD signal path and hence the power amplifier can be improved.

With the above general understanding borne in mind, various embodiments for providing the time-interpolated DPD adaptation are described below.

Because one or more of the above-described embodiments and embodiments described throughout the application are exemplified using a particular type of IC, a detailed description of such an IC is provided below. However, it should be understood that other types of ICs may benefit from one or more of the embodiments described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device (CPLD). A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

In general, each of these programmable logic devices ("PLDs"), the functionality of the device is controlled by configuration data provided to the device for that purpose. The configuration data can be stored in volatile memory (e.g., static memory cells, as common in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

As noted above, advanced FPGAs can include several different types of programmable logic blocks in the array. For example, FIG. 1 illustrates an exemplary FPGA architecture 100. The FPGA architecture 100 includes a large number of different programmable tiles, including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile can include at least one programmable interconnect element ("INT") 111 having connections to input and output terminals 120 of a programmable logic element within the same tile, as shown by examples included at the top of FIG. 1. Each programmable interconnect element 111 can also include connections to interconnect segments 122 of adjacent programmable interconnect element(s) in the same tile or other tile(s). Each programmable interconnect element 111 can also include connections to interconnect segments 124 of general routing resources between logic blocks (not shown). The general routing resources can include routing channels between logic blocks (not shown) comprising tracks of interconnect segments (e.g., interconnect segments 124) and switch blocks (not shown) for connecting interconnect segments. The interconnect segments of the general routing resources (e.g., interconnect segments 124) can span one or more logic blocks. The programmable interconnect elements 111 taken together with the general routing resources implement a programmable interconnect structure ("programmable interconnect") for the illustrated FPGA.

In an example implementation, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 106 can include a DSP logic element ("DSPL") 114 in addition to an appropriate number of programmable interconnect elements. An 10B 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the example of FIG. 1, an area (depicted horizontally) near the center of the die (e.g., formed of regions 105, 107, and 108 shown in FIG. 1) can be used for configuration, clock, and other control logic. Column 109 (depicted vertically) extending from this horizontal area or other columns may be used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, PROC 110 spans several columns of CLBs and BRAMs. PROC 110 can include various components ranging from a single microprocessor to a complete programmable processing system of microprocessor(s), memory controllers, peripherals, and the like.

In one aspect, PROC 110 is implemented as a dedicated circuitry, e.g., as a hard-wired processor, that is fabricated as part of the die that implements the programmable circuitry of the IC. PROC 110 can represent any of a variety of different processor types and/or systems ranging in complexity from an individual processor, e.g., a single core capable of executing program code, to an entire processor system having one or more cores, modules, co-processors, interfaces, or the like.

In another aspect, PROC 110 is omitted from architecture 100, and may be replaced with one or more of the other varieties of the programmable blocks described. Further, such blocks can be utilized to form a "soft processor" in that the various blocks of programmable circuitry can be used to form a processor that can execute program code, as is the case with PROC 110.

The phrase "programmable circuitry" can refer to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, portions shown in FIG. 1 that are external to PROC 110 such as CLBs 102 and BRAMs 103 can be considered programmable circuitry of the IC.

In some embodiments, the functionality and connectivity of programmable circuitry are not established until configuration data is loaded into the IC. A set of configuration data can be used to program programmable circuitry of an IC such as an FPGA. The configuration data is, in some cases, referred to as a "configuration bitstream." In general, programmable circuitry is not operational or functional without first loading a configuration bitstream into the IC. The configuration bitstream effectively implements or instantiates a particular circuit design within the programmable circuitry. The circuit design specifies, for example, functional aspects of the programmable circuit blocks and physical connectivity among the various programmable circuit blocks.

In some embodiments, circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 110.

In some instances, hardwired circuitry can have one or more operational modes that can be set or selected according to register settings or values stored in one or more memory elements within the IC. The operational modes can be set, for example, through the loading of a configuration bitstream into the IC. Despite this ability, hardwired circuitry is not considered programmable circuitry as the hardwired circuitry is operable and has a particular function when manufactured as part of the IC.

FIG. 1 is intended to illustrate an exemplary architecture that can be used to implement an IC that includes programmable circuitry, e.g., a programmable fabric. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual IC, more than one adjacent row of CLBs is typically included wherever the CLBs appear, to facilitate the efficient implementation of user logic, but the number of adjacent CLB rows varies with the overall size of the IC. Moreover, the FPGA of FIG. 1 illustrates one example of a programmable IC that can employ examples of the interconnect circuits described herein. The interconnect circuits described herein can be used in other types of programmable ICs, such as CPLDs or any type of programmable IC having a programmable interconnect structure for selectively coupling logic elements.

It is noted that the IC that may implement the one or more embodiments described herein is not limited to the exemplary IC depicted in FIG. 1, and that IC having other configurations, or other types of IC, may also implement those embodiments.

Figure 2:
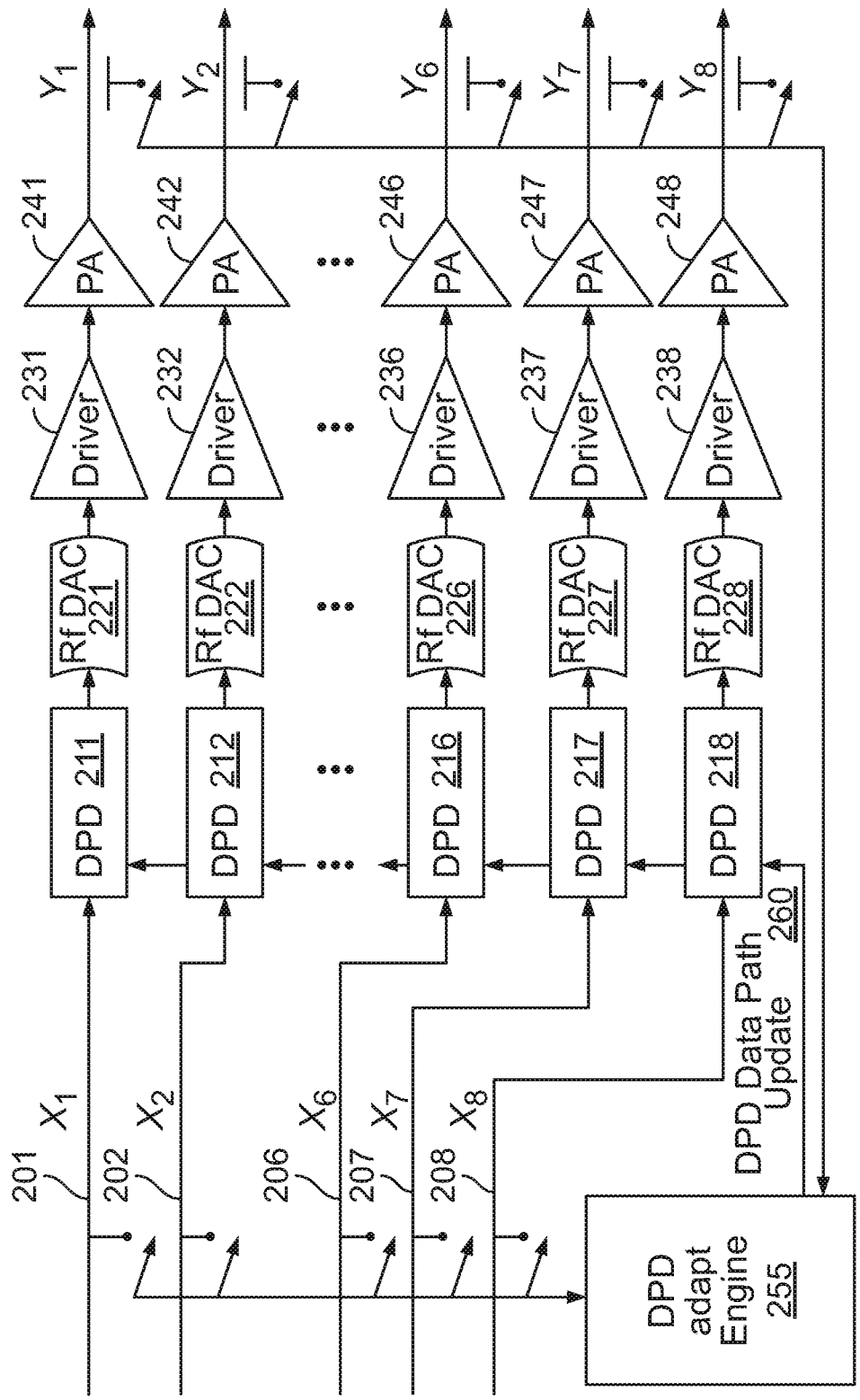
FIG. 2 is a block diagram illustrating an exemplary structure of a RF MIMO transmitter containing a set of parallel DPD data paths which may be implemented on the IC architecture shown in FIG. 1, according to some embodiments of the present disclosure.

FIG. 2 is a block diagram illustrating an exemplary structure of a RF MIMO transmitter containing a set of parallel DPD data paths which may be implemented on the IC architecture shown in FIG. 1, according to some embodiments of the present disclosure. FIG. 2 shows a MIMO transmitter 200 that includes a number of parallel input paths 201-208 corresponding to a number of inputs $X_1, X_2, \ldots X_8$ for transmission. Along each input path, the input data, e.g., any of $X_1, X_2, \ldots X_8$, is sent to a DPD circuit (any of 211-218) configured to correct the gain and phase nonlinearities of the corresponding power amplifiers (e.g., 241-248 correspondingly) on the same input path. The corrected input is then sent to a RF digital-to-analog converter (DAC) (e.g., 221-228 correspondingly), which in turn converts the digital input signal to an analog signal to be passed to the power amplifier 241-248 (also referred to as transmit power amplifier or amplifier) via a driver circuit (e.g., 231-238 correspondingly). The output signals $Y_1, Y_2, \ldots Y_8$ of the amplifiers 241-248 may then be transmitted onto multiple antennas (e.g. with respective channels).

The input ends of the transmission paths 201-208 are each configured to be connected to a DPD adaptation engine 255 via a switch, such that information relating to one or more inputs $X_1, X_2, \ldots X_8$ may be shared with the DPD adaptation engine 255 when the corresponding switches are connected to the DPD adaptation engine 255. On the other hand, the output ends of the amplifiers 241-248 are each configured to be connected (through for example, couplers, RF attenuators, and RF ADCs) to the DPD adaptation engine 255 via a switch, such that information relating to the one or more signals $Y_1, Y_2, \ldots Y_8$ may be shared with the DPD adaptation engine 255 when the corresponding switches are connected to the DPD adaptation engine 255. For example, the DPD adaptation engine 255 may retrieve signal information such as the signal amplitudes of $X_i$ and $Y_i$, i=1, 2, 3, . . . 8, and determine the power mode of the amplifiers 241-248, based on which the DPD data path update 260, e.g., a set of coefficients adapted according to the power mode of the amplifiers, may be sent to the DPD circuits 211-218. During each adaptation iteration, the DPD adaptation engine 255 adapts the DPD coefficients in a stable transmit power state, and the adapted DPD coefficients are saved according to several different transmit root mean square (RMS) power levels. For example, a transmit power meter (shown at 315 in FIG. 4) may be used to monitor the transmit RMS power for each power amplifier 241-248 in order to select the DPD coefficients to run the corresponding DPD circuit 211-218. When the power meter reports a significant step transmit power change, the DPD coefficient management engine 325 may use the saved DPD coefficients corresponding to the new transmitter RMS power in the corresponding DPD data paths.

Specifically, as only one DPD adaptation engine 255 is used to adapt the DPD coefficients of all DPD circuits 211-218 in the parallel input paths of the MIMO transmitter 200, the DPD adaptation engine 255 is used to adapt the DPD circuits 211-218 sequentially, e.g., as shown in FIG. 2, from DPD circuit 211 to DPD circuit 218. The sequential adaptation process may cause a significant delay for the input data paths 201-208 to reach an optimized ACPR performance. For example, it may take about 2-3 seconds for one DPD adaptation engine 255 to finish one adaptation iteration for the eight power amplifiers 241-248 in a row. During the transient period when one or more power amplifiers of 241-248 are being adapted and have not reached the stable state of a power level yet, the input paths 201-208 may suffer from performance degradation, because the operating DPD coefficients of the DPD circuits 211-218 may not match with the actual temperature state or the gains of the power levels of the power amplifiers 241-248.

Figure 3:
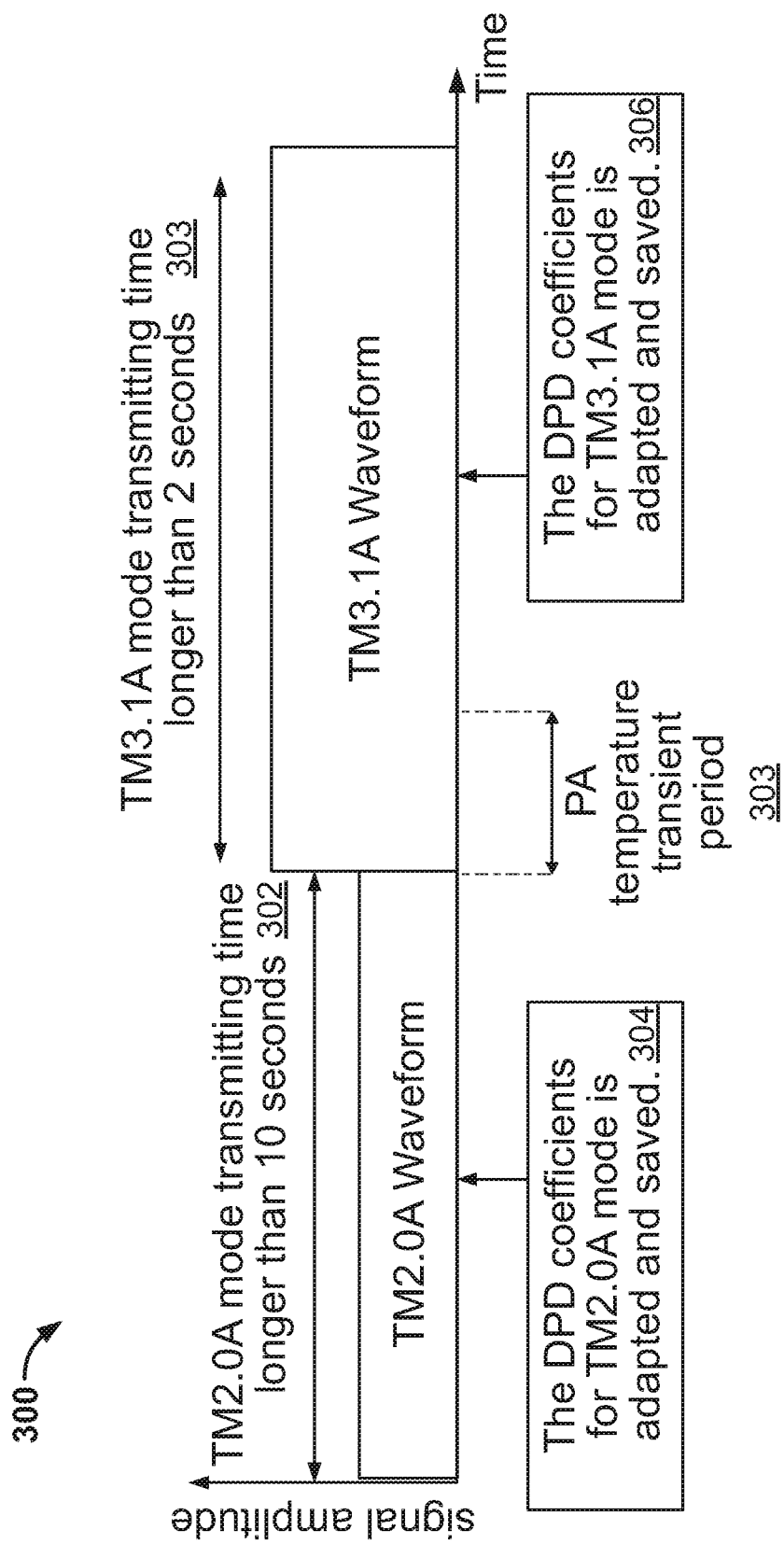
FIG. 3 is a block diagram illustrating an exemplary transition of a RF amplifier which may be implemented at the RF MIMO transmitter illustrated in FIG. 2 from a low power mode to a high-power mode, according to some embodiments of the present disclosure.

FIG. 3 is a block diagram illustrating an exemplary transition of a RF amplifier which may be implemented at the RF MIMO transmitter illustrated in FIG. 2 from a low power mode to a high-power mode, according to some embodiments of the present disclosure. The data chart 300 shows the signal amplitudes of the output signals of power amplifiers (e.g., 241-248 in FIG. 2) over time. In a 5G MIMO application, two common transmission power modes include the TM2.0A transmit mode and TM3.1A transmit mode. The TM2.0A transmit mode is a transmit mode with 256 quadrature amplitude modulation (QAM) with a low user data load and thus the RMS power of TM2.0A mode is low, which also renders a low power amplifier temperature. In some examples, the power amplifier output of 256-QAM EVM is about 6.3% without DPD and about 0.5% with DPD (e.g., for an under tested amplifier). The TM3.1A transmit mode is a transmit mode with 256-QAM with a full load of user data. The RMS power of TM3.1A mode is about 10 dB higher than the RMS power in TM2.0A mode, resulting in a much higher power amplifier temperature in TM3.1A mode is much higher than that in TM2.0A mode. In some examples, the power amplifier output 256-QAM data EVM in TM3.1A mode is about 2.7% without DPD and 0.4% with DPD (e.g., for the under tested amplifier).

As shown in data chart 300, during the first time period 302, the MIMO transmitter may be operated under the TM2.0A mode, e.g., for more than 10 seconds. During the time period 303, the MIMO transmitter may be operated under the TM3.1A mode, e.g., for at least two seconds.

The power amplifier transmit RMS power may change in a step profile between the TM2.0A mode frame and the TM3.1A mode frame. The power amplifiers are then heating to a higher temperature after the transition to TM3.1A mode, but it may take longer than several seconds for the amplifier temperature to reach a stable temperature state, e.g., as shown by the transient period 303.

The DPD coefficients are adapted at a quasi-stable power amplifier temperature state. For example, during the time period 302 when the transmitter is operated under TM2.0A mode, the DPD coefficients for TM2.0A mode are adapted at 304. During the transient period 303 when the transmitter is operated under TM3.1A mode, the DPD coefficients for TM3.1A mode are adapted at 306. The DPD circuit (e.g., 211-218 in FIG. 2) may switch the DPD coefficients adapted at TM3.1A mode to the DPD data paths after a digital transmit power detector detects the transmit power change, which may take less than 20 ms for the power detector to detect the power change and the DPD circuit to apply the saved DPD coefficients for TM3.1A mode. However, the transient period 303 is usually much longer than the time (e.g., less than 20 ms) for the DPD coefficients to switch from the coefficients of a stable TM2.0A mode to the coefficients of a stable TM3.01A mode, causing a mismatch between the DPD coefficients and the actual temperature dependent gain level of the power amplifier is operating at during the transient period 303, which may adversely affect the ACPR performance of DPD.

Figure 4:
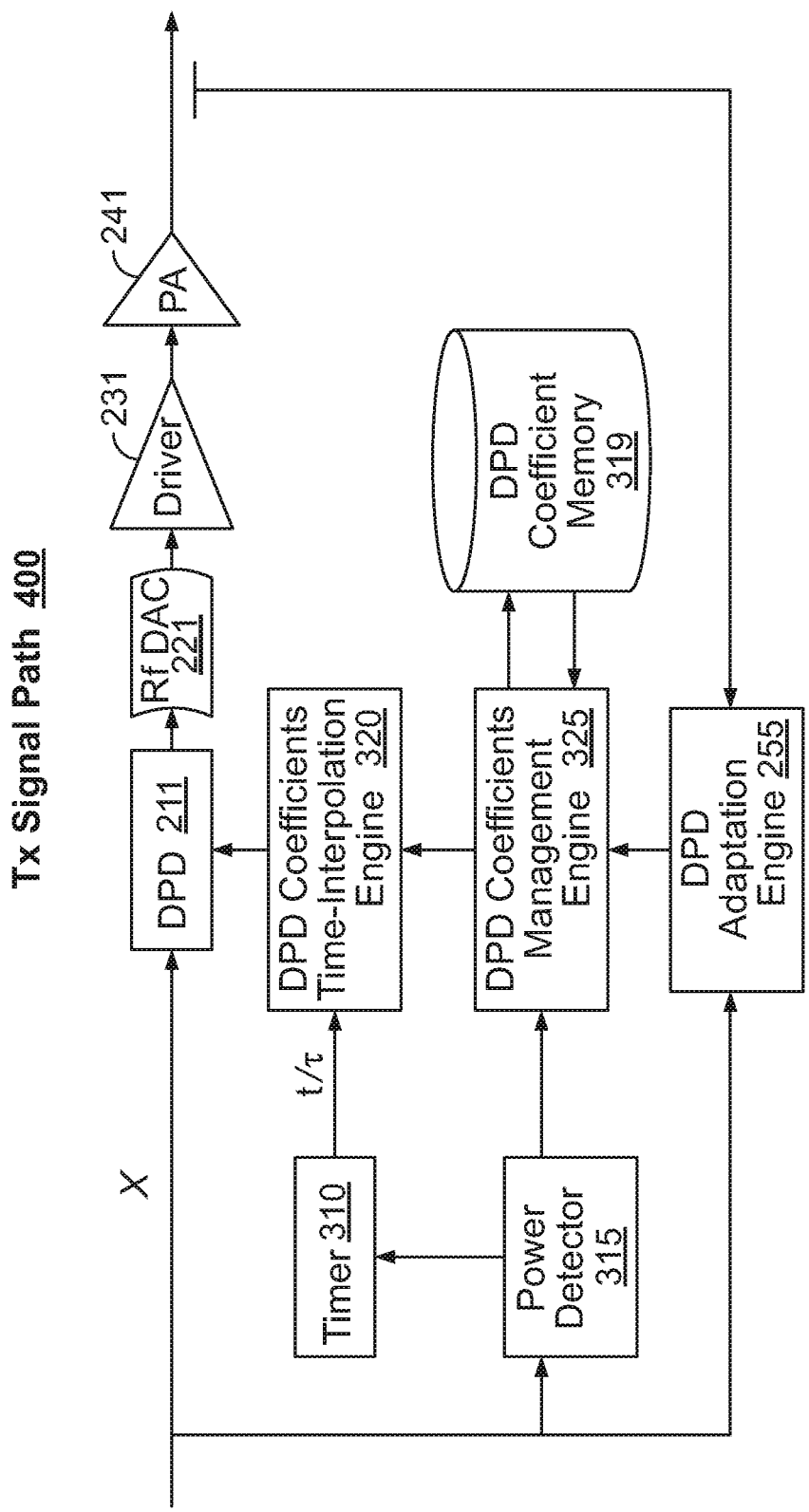
FIG. 4 is a block diagram illustrating a transmitter signal path that is configured to be adapted with time-interpolated DPD coefficients during power mode transition, according to some embodiments of the present disclosure.

FIG. 4 is a block diagram illustrating a transmitter signal path that is configured to be adapted with time-interpolated DPD coefficients during power mode transition, according to some embodiments of the present disclosure. The transmitter signal path 400 may include a DPD circuit 211 which is configured to receive the digital transmission symbol X, a RF DAC 221, the driver 231 and the power amplifier 241, which may be similar to those shown in FIG. 2. The DPD adaptation engine 255 is connected to the input end of the DPD 211 and also the output end of power amplifier 241 to obtain information relating to the input symbol X and the output signal from the transmitter, as described in FIG. 2.

The DPD adaptation engine 255 is further connected to a DPD coefficients management engine 325, which is configured to retrieve DPD coefficients according to a power mode from a DPD coefficient memory 319. For example, the DPD coefficient memory 319 may be configured to store DPD coefficients when the transmitter is operated at a stable state under the TM2.0A mode, DPD coefficients when the transmitter is operated at a stable state under the TM3.1A mode, and/or other power mode. The DPD coefficient management engine 325 may provide an indication of the power mode to the DPD coefficient memory 319, which in turn returns the set of DPD coefficients corresponding to the power mode.

A power detector 315 is connected to the DPD coefficient management engine 325, configured to detect an operating power change from the input data load. For example, when the power detector 315 detects that the input data load has changed from a low data load to a full data load, meaning the power mode has changed from TM2.0A to TM3.1A, the power detector 315 provides a power mode change indication to the DPD coefficients management engine 325 such that the DPD coefficient management engine 325 retrieves the DPD coefficients corresponding to TM3.1A mode from the memory 319.

As described in relation to FIG. 3, a transient period 303 of the power amplitude temperature may be encountered after the power mode transition occurs. The power amplifier temperature change during the transient period can be described by the following thermal equation:

$$\frac{\partial T(t)}{\partial t} = \alpha P_{RMS} - \beta(T(t) - T_s)$$

where T(t) is the temperature of the power amplifier over time t, $P_{RMS}$ is the power amplifier RMS output power, $T_s$ is the power amplifier surrounding temperature, and $\alpha, \beta$ are pre-selected constants. Thus, according to the above equation, T(t) may be expressed as:

$$T(t) = T_2 - (T_2 - T_1)e^{-\beta t}$$

where $T_1$ and $T_2$ are stable power amplifier temperatures when the power amplifier operates at TM2.0A mode and TM3.1A mode correspondingly, and $\beta$ is a constant representing the thermal constant of the power amplifier. Thus, the power amplifier non-linear model or the DPD non-linear mode can be expressed in the following equation:

$$X \times G(T(t)) = u(X) \times C(T(t))$$

where X is a transmit data ensemble used to train the DPD model. X is usually arranged in the form of a data array, e.g., $X = \{x(n_1), x(n_2), x(n_3), \ldots, x(N-1), x(N)\}$. G(T(t)) is the non-linear gain of the power amplifier 241, which is a function of the amplifier temperature; u(X) is a non-linear model for the data ensemble. The non-linear model, for example, can be a Volterra polynomials in the form of a matrix, and C(T(t)) represents the coefficients in a form of an array, which is a function of the amplifier temperature. During the transient period 303 from TM2.0A model to TM3.1A mode, the amplifier gain and the DPD coefficients may then drift, as a function of the amplifier temperature:

$$X \times \left\{ G(T_1) + \frac{\partial G(T)}{\partial T} \frac{\partial T(t)}{\partial (t)} \delta t \right\} = u(X) \times \left\{ C(T_1) + \frac{\partial C(T)}{\partial T} \frac{\partial T(t)}{\partial t} \delta t \right\}$$

If the amplifier gain is assumed to be a linear function of the amplifier temperature in a 1st order approximation and the thermal time constant is long, $\partial T(t)/\partial t$ may be treated as a constant. Hence, the DPD coefficients are approximately linear versus the amplifier temperature as described by:

$$C(T(t)) = C(T_1)\frac{\tau - t}{\tau} + C(T_2)\frac{t}{\tau}$$

Where t is the time relative to the instant when TM2.0A mode changes to TM3.1A mode, $\tau$ is the time duration of the transient period. A discrete time interpolation may be used at discrete time intervals $\Delta t$:

$$C(T(t_i)) = C(T_1)\frac{\tau - t_i}{\tau} + C(T_2)\frac{t_i}{\tau}$$

where $t_i = i \times \Delta t$, $i = 1, 2, 3, 4, \ldots$

Therefore, the transmitter signal path 400 may further include a timer 310 that is connected to the power detector 315 and is configured to start the timer for the transient period $\tau$ in response to receiving an indication of power mode change from TM2.0A to TM3.1A from the power detector 315. The timer 310 may then provide the timing parameter $t/\tau$, or $$\frac{t_i}{\tau}$$

in the discrete time form to the DPD coefficients time-interpolation engine 320, which in turn compute the time-interpolated DPD coefficients $C(T(t_i))$ during the transient period. The time-interpolated DPD coefficients $C(T(t_i))$ are then sent to the DPD circuit 211 for operating the DPD circuit 211 during the transient period.

In some embodiments, each transmitter signal path (any of 201-208) comprising the DPD (any of 211-218), RF DAC (any of 221-228), driver circuit (any of 231-238) and power amplifier (any of 241-248) shown in FIG. 2 may be coupled to (e.g., paired with) a power detector, a timer 310, a DPD coefficient time-interpolation engine 320 and the DPD coefficient management engine 325 such that along each transmitter signal path, the DPD coefficients may be computed and configured with time-interpolation depending on the power mode change on the respective transmitter signal path, in parallel to the DPD coefficient configuration on other transmitter signal paths.

In some embodiments, the power detector, the timer 310, the DPD coefficient time-interpolation engine 320 and the DPD coefficient management engine 325 may jointly compute and configure the DPD coefficients for all transmitter signal paths 201-208. For example, the output from the DPD coefficient time-interpolation engine 320, e.g., the time-interpolated DPD coefficients, may be sent to the DPD circuits 211-218 sequentially in a similar manner as the DPD data path update 260 is sent to the DPD circuits from 218 to 211.

Figure 5:
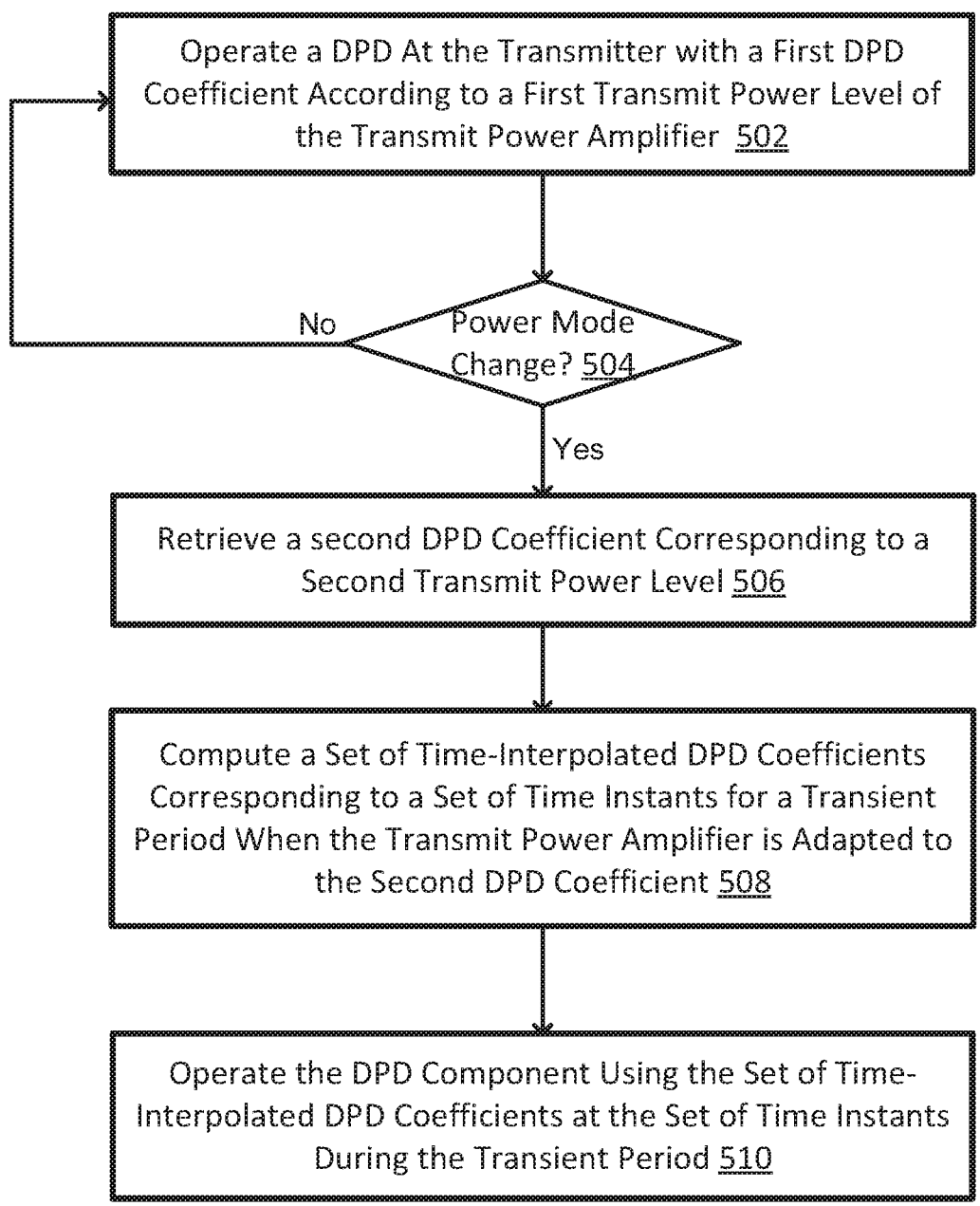
FIG. 5 is a logic flow diagram illustrating adapting a RF transmitter shown in FIG. 4 with time-interpolated DPD coefficients during power mode transition to improve ACPR performance, according to some embodiments of the present disclosure.

FIG. 5 is a logic flow diagram illustrating a process 500 of adapting a RF transmitter shown in FIG. 4 with time-interpolated DPD coefficients during power mode transition to improve ACPR performance, according to some embodiments of the present disclosure. Process 500 may start at step 502, at which a DPD circuit (e.g., 211 in FIG. 4) at a transmitter (e.g., 400 in FIG. 4) may be operated with a first DPD coefficient according to a first transmit power level of the transmit power amplifier (e.g., 241 in FIG. 4). For example, the DPD circuit may be operated at a state power state under TM2.0A using DPD coefficients according to the TM2.0A mode, e.g., $C(T_1)$.

At step 504, process 500 determines whether there is a power mode change. For example, the power detector 315 shown in FIG. 4 determines whether the user data load has changed, e.g., from a low data load to a full data load, indicating the power mode change from TM2.0A to TM3.1A. If no power mode change is detected, process 500 proceeds with step 502 to continue operate the DPD circuit using the DPD coefficient based on the current power state.

If a power mode change is detected at step 504, process 500 proceeds to step 506, at which a second DPD coefficient corresponding to the second transmit power level is retrieved. For example, the DPD coefficient management engine 325, in response to receiving a power mode change indication from the power detector 315, may retrieve DPD coefficient corresponding to the changed power mode, e.g., $C(T_2)$ corresponding to TM3.1A, from the DPD coefficient memory 319.

At step 508, a set of time-interpolated DPD coefficients are computed corresponding to a set of time instants for a transient period when the transmit power amplifier (e.g., 241 in FIG. 4) changes from the first level to the second level. For example, the DPD coefficient time-interpolation engine 320 may compute time-interpolated DPD coefficients $C(T(t_i))$ at discrete-time instants $t_i=i\times\Delta t, i=1, 2, 3, 4, \ldots$ during the transient period, based on the DPD coefficients $C(T_1)$ used at the stable TM2.0A mode, and $C(T_2)$ used at the stable TM3.1A mode.

At step 510, the DPD circuit (also referred to as a DPD component) (e.g., 211 in FIG. 4) is operated using the set of time-interpolated DPD coefficients at the set of time instants during the transient period. For example, the DPD coefficient time-interpolation engine 320 may send the computed time-interpolated DPD coefficients $C(T(t_i))$ at discrete-time instants $t_i =i\times\Delta t$, $i=1, 2, 3, 4, \ldots$ to the DPD circuit 211.

Figure 6A:
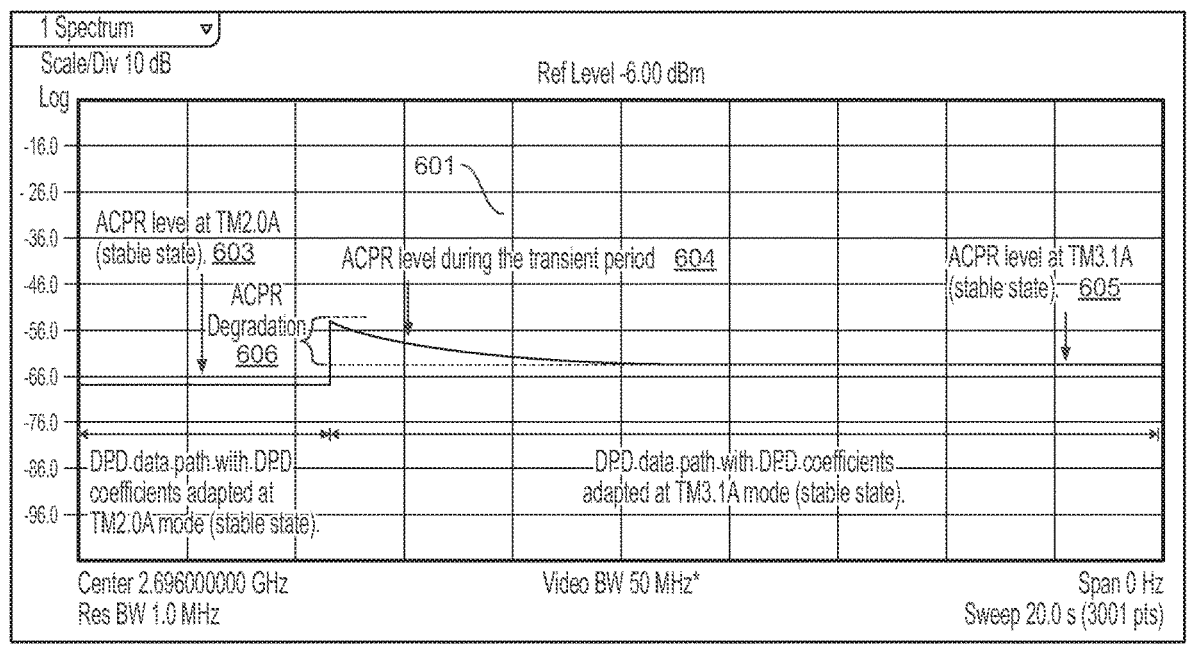
FIGS. 6A-6B are block diagrams comparing the ACPR performance of a RF transmitter without and with time-interpolated DPD coefficients during power mode transition, according to some embodiments of the present disclosure.
Figure 6B:
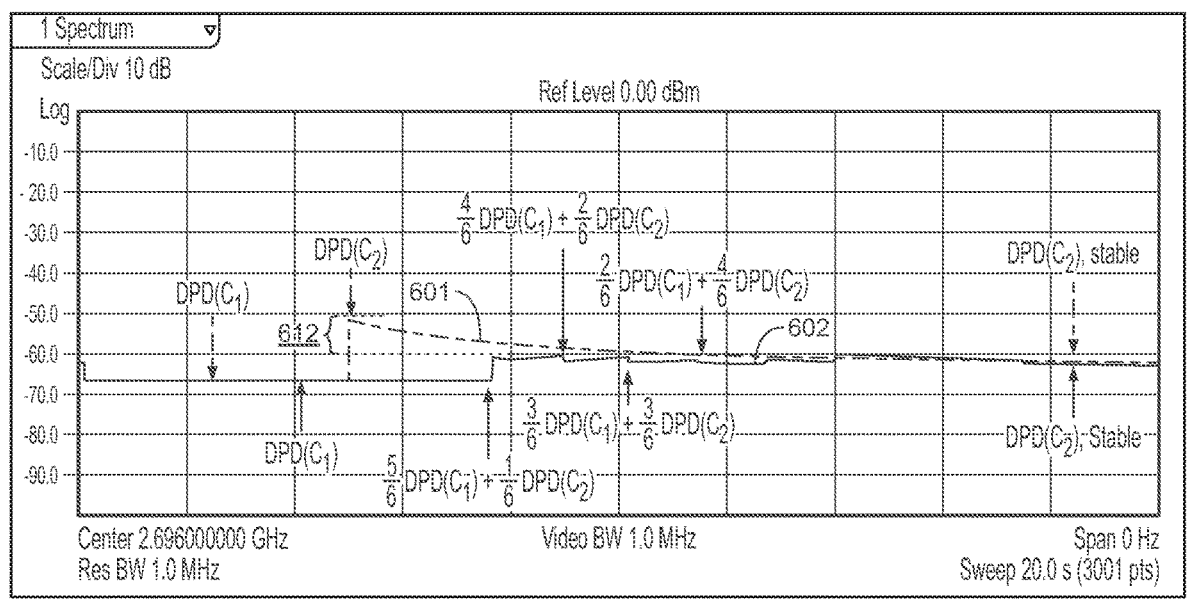

FIGS. 6A-6B are block diagrams comparing the ACPR performance of a RF transmitter without and with time-interpolated DPD coefficients during power mode transition, according to some embodiments of the present disclosure. In FIG. 6A, data chart 601 shows the ACPR performance level (dB) from the period 603 under power mode TM2.0A to the time period 605 under power mode TM3.1A. Specifically, in FIG. 6A, the DPD data path with DPD coefficients were adapted at a stable TM2.0A mode power state during time period 603, and is adapted to DPD coefficients adapted at a stable TM3.1A mode power state immediately after the power mode change, during both the transient period 604 and the time period 605. Thus, the ACPR level shows a 10 dB ACPR degradation at 606 from the transient period 604 to the time period 605 under TM3.1A.

In FIG. 6B, data plot 602 compares the ACPR performance level data plot 601 (similar to that shown in FIG. 6A) with the ACPR performance level data plot 602, at which time-interpolated DPD coefficients are used during the transient period from TM2.0A to TM3.1A mode. As shown in FIG. 6B, instead of applying DPD coefficient from $DPD(C_1)$ to $DPD(C_2)$ immediately after the power mode change, a set of time-interpolated DPD coefficients throughout discrete time instants during the transient period are applied, e.g., $$DPD(C_1), \frac{5}{6}DPD(C_1)+\frac{1}{6}DPD(C_2), \frac{4}{6}DPD(C_1)+\frac{2}{6}DPD(C_2),$$

$$\frac{3}{6}DPD(C_1)+\frac{3}{6}DPD(C_2), \frac{2}{6}DPD(C_1)+\frac{4}{6}DPD(C_2),$$

$$\frac{1}{6}DPD(C_1)+\frac{5}{6}DPD(C_2), DPD(C_2),$$

etc, until the end of the transient period when the power amplifier reaches the stable state (e.g., under TM3.1A). As shown by the data plot 602, the peak ACPR degradation during the transient period may improve about 8 dB (shown at 612) as compared to the data plot 601 (with no time-interpolation).

It is noted that various configurations illustrated in FIGS. 1-6B are exemplary only and not intended to be limiting beyond what is specifically recited in the claims that follow. It will be understood by those skilled in that art that other configurations may be used. One or more elements in the various embodiments may be implemented by software, hardware (e.g., an application specific integrated circuit (ASIC), application-specific standard parts (ASSPs), a logic on a programmable logic IC (e.g., FPGA)), firmware, and/or a combination thereof. The embodiments may be implemented using various hardware resources, such as for example DSP slices, BRAM, and programmable resources of an FPGA; however, in other embodiments, digital signal processors, microprocessors, multi-core processors, memory, and/or other hardware may be used. When implemented in software, the elements of the embodiments of the invention are essentially the code segments to perform the necessary tasks. The program or code segments can be stored in a processor-readable storage medium or device that may have been downloaded by way of a computer data signal embodied in a carrier wave over a transmission medium or a communication link. The processor readable storage device may include any medium that can store information including an optical medium, semiconductor medium, and magnetic medium. Processor readable storage device examples include an electronic circuit; a semiconductor device, a semiconductor memory device, a read-only memory (ROM), a flash memory, an erasable programmable read-only memory (EPROM); a floppy diskette, a CD-ROM, an optical disk, a hard disk, or other storage device. The code segments may be downloaded via computer networks such as the Internet, Intranet, etc.

Although particular embodiments have been shown and described, it will be understood that it is not intended to limit the claimed inventions to the preferred embodiments, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents.

What is claimed is:

1. A transmit circuit, comprising:
   an amplifier;
   a digital pre-distortion (DPD) circuit configured to:
      operate with a first DPD coefficient corresponding to a first transmit power level of the amplifier;
   a DPD coefficient management engine configured to:
      in response to a power mode change of the amplifier from the first transmit power level to a second transmit power level, provide a second DPD coefficient corresponding to the second transmit power level;
   a DPD coefficient time-interpolation engine configured to:
      compute a set of time-interpolated DPD coefficients corresponding to a set of time instants for a transient period when the amplifier changes from the first transmit power level to the second transmit power level based on the second DPD coefficient; and
      provide, to the DPD circuit, the set of time-interpolated DPD coefficients for operating at the set of time instants during the transient period.

2. The transmit circuit of claim 1, further comprising:
   a power detector configured to:
      detect the power mode change of the amplifier; and
      provide an indication of the power mode change to the DPD coefficient management engine.

3. The transmit circuit of claim 1, further comprising:
   a DPD coefficient database configured to:
      store different DPD coefficients corresponding to different transmit power levels; and provide the second DPD coefficient to the DPD coefficient management engine in response to a query indicating the second transmit power level.

4. The transmit circuit of claim 1, further comprising:
a DPD adaptation engine configured to adapt DPD coefficients used for operating the DPD circuit for the amplifier in response to a changed transmit power level.

5. The transmit circuit of claim 1, further comprising:
a timer configured to maintain a counter for the transient period during which the set of time-interpolated DPD coefficients are used for operate the DPD circuit.

6. The transmit circuit of claim 1, wherein the DPD coefficient time-interpolation engine is configured to compute the set of time-interpolated DPD coefficients by:
compute a time-varying representation of an amplifier temperature during the transient period based on a first stable temperature of the amplifier at the first transmit power level and a second stable temperature of the amplifier at the second transmit power level.

7. The transmit circuit of claim 6, wherein the DPD coefficient time-interpolation engine is configured to compute the set of time-interpolated DPD coefficients by:
computing a representation of DPD coefficient that is linear over the time-varying representation of the amplifier temperature based on the first DPD coefficient and the second DPD coefficient.

8. The transmit circuit of claim 7, wherein the DPD coefficient time-interpolation engine is configured to compute the set of time-interpolated DPD coefficients by:
extracting the set of time-interpolated DPD coefficients from the computed representation of DPD coefficient at the set of time instants.

9. The transmit circuit of claim 1, further comprising:
a plurality of parallel DPD circuits all configured to operate at the first DPD coefficient, and
wherein the DPD coefficient time-interpolation engine is configured to compute and send the set of time-interpolated DPD coefficients for operating all the plurality of parallel DPD circuits at the set of time instants during the transient period.

10. The transmit circuit of claim 1, further comprising:
a plurality of parallel DPD circuits, wherein each DPD circuit is configured to operate at a respective DPD coefficient, and each DPD circuit is coupled to a respective DPD coefficient time-interpolation engine configured to compute and send a respective set of time-interpolated DPD coefficients for operating the respective DPD circuit during a respective transient period when the respective transmit power level corresponding to the respective DPD circuit changes.

11. A method, comprising:
operating a digital pre-distortion (DPD) circuit of a transmit circuit with a first DPD coefficient according to a first transmit power level of an amplifier of the transmit circuit;
in response to a power mode change of the amplifier from the first transmit power level to a second transmit power level, providing, by a DPD coefficient management engine, a second DPD coefficient corresponding to the second transmit power level;
computing a set of time-interpolated DPD coefficients corresponding to a set of time instants for a transient period when the amplifier changes from the first transmit power level to the second transmit power level based on the second DPD coefficient; and
operating the DPD circuit using the set of time-interpolated DPD coefficients at the set of time instants during the transient period.

12. The method of claim 11, further comprising:
detecting the power mode change of the amplifier; and
provide an indication of the power mode change to the DPD coefficient management engine.

13. The method of claim 11, further comprising:
storing, at a memory, different DPD coefficients corresponding to different transmit power levels; and
retrieving, from the memory, the second DPD coefficient to the DPD coefficient management engine in response to a query indicating the second transmit power level.

14. The method of claim 11, further comprising:
adapting the DPD coefficients used for operating the DPD circuit for the amplifier in response to a changed transmit power level.

15. The method of claim 11, further comprising:
maintaining a timer for the transient period during which the set of time-interpolated DPD coefficients are used for operate the DPD circuit.

16. The method of claim 11, wherein the computing the set of time-interpolated DPD coefficients further comprises:
computing a time-varying representation of an amplifier temperature during the transient period based on a first stable temperature of the amplifier at the first transmit power level and a second stable temperature of the amplifier at the second transmit power level.

17. The method of claim 16, wherein the computing the set of time-interpolated DPD coefficients further comprises:
computing a representation of DPD coefficient that is linear over the time-varying representation of the amplifier temperature based on the first DPD coefficient and the second DPD coefficient.

18. The method of claim 17, wherein the computing the set of time-interpolated DPD coefficients further comprises:
extracting the set of time-interpolated DPD coefficients from the computed representation of DPD coefficient at the set of time instants.

19. The method of claim 11, further comprising:
operating a plurality of parallel DPD circuits all configured at the first DPD coefficient; and
computing and sending the set of time-interpolated DPD coefficients for operating all the plurality of parallel DPD circuits at the set of time instants during the transient period.

20. The method of claim 11, further comprising:
operating each DPD circuit from a plurality of parallel DPD circuits at a respective DPD coefficient,
wherein each DPD circuit is coupled to a respective DPD coefficient time-interpolation engine configured to compute and send a respective set of time-interpolated DPD coefficients for operating the respective DPD circuit during a respective transient period when the respective transmit power level corresponding to the respective DPD circuit changes.

* * * * *